(12) United States Patent  (10) Patent No.: US 8,385,063 B2
Zhu et al.  (45) Date of Patent: Feb. 26, 2013

(54) ELECTRONIC DEVICE

(75) Inventors: Hong-Wei Zhu, Shenzhen (CN);
Chieh-Yu Lee, Taipei Hsien (TW);
Hai-Yang Yu, Shenzhen (CN);
Er-Zheng Zhao, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 743 days.

(21) Appl. No.: 12/629,898

(22) Filed: Dec. 3, 2009

(65) Prior Publication Data

US 2011/0012846 A1   Jan. 20, 2011

(51) Int. Cl.
*G06F 1/16* (2006.01)
*G06F 3/02* (2006.01)
*E05C 17/56* (2006.01)

(52) U.S. Cl. ......... 361/679.58; 361/679.55; 361/679.56; 361/679.09; 361/679.27; 292/251.5; 345/169; 345/905

(58) Field of Classification Search .......... 361/679.01–679.45, 679.55–679.59; 292/251.5; 345/156, 157, 168, 169, 905; 455/575.1, 575.3, 575.4
See application file for complete search history.

(56) References Cited

U.S. PATENT DOCUMENTS

| | | | | |
|---|---|---|---|---|
| 5,200,913 | A * | 4/1993 | Hawkins et al. | 361/679.09 |
| 5,548,478 | A * | 8/1996 | Kumar et al. | 361/679.27 |
| 6,517,129 | B1 * | 2/2003 | Chien et al. | 292/251.5 |
| 7,106,579 | B2 * | 9/2006 | Maskatia et al. | 361/679.28 |
| 7,158,634 | B2 * | 1/2007 | Eromaki | 379/433.13 |
| 7,407,202 | B2 * | 8/2008 | Ye et al. | 292/251.5 |
| 7,637,540 | B2 * | 12/2009 | Chiang | 292/45 |
| 8,009,424 | B2 * | 8/2011 | Zhu et al. | 361/679.58 |
| 8,085,533 | B2 * | 12/2011 | Zhao et al. | 361/679.58 |
| 2003/0030971 | A1 * | 2/2003 | Duarte | 361/680 |
| 2008/0179897 | A1 * | 7/2008 | Wu et al. | 292/251.5 |
| 2008/0180892 | A1 * | 7/2008 | Lai | 361/680 |

* cited by examiner

*Primary Examiner* — Jayprakash N Gandhi
*Assistant Examiner* — Nidhi Desai
(74) *Attorney, Agent, or Firm* — Altis Law Group, Inc.

(57) ABSTRACT

An electronic device includes a body, a cover, a sliding apparatus, and a latch assembly. The body defines two sliding slots. The sliding apparatus is received in the two sliding slots and is slidable relative to the two sliding slots. The cover is foldable on the body and is rotatably coupled to the sliding apparatus. The latch assembly is fixed to the sliding apparatus. When the latch assembly latches the body, the sliding apparatus is unlatched from the electronic device, and the cover is slidable relative to the body and is unfolded while the cover slides away from the body.

14 Claims, 9 Drawing Sheets

ELECTRONIC DEVICE

BACKGROUND

1. Technical Field

The disclosure relates to electronic devices, and more particularly, to an electronic device having a latch assembly.

2. Description of Related Art

Portable electronic devices, such as foldable laptop computers, are in widespread use. Keyboards are provided to receive user inputs. Recently, however, many laptop computers include touch sensitive displays. However, in a foldable device, the display must be unfolded first to access the touch/contact display. This is an inconvenience. Therefore, there is room for improvement in the art.

BRIEF DESCRIPTION OF THE DRAWINGS

The components of the drawings are not necessarily drawn to scale, the emphasis instead being placed upon clearly illustrating the principles of an electronic device. Moreover, in the drawings, like reference numerals designate corresponding parts throughout several views.

DETAILED DESCRIPTION

Figure 1:
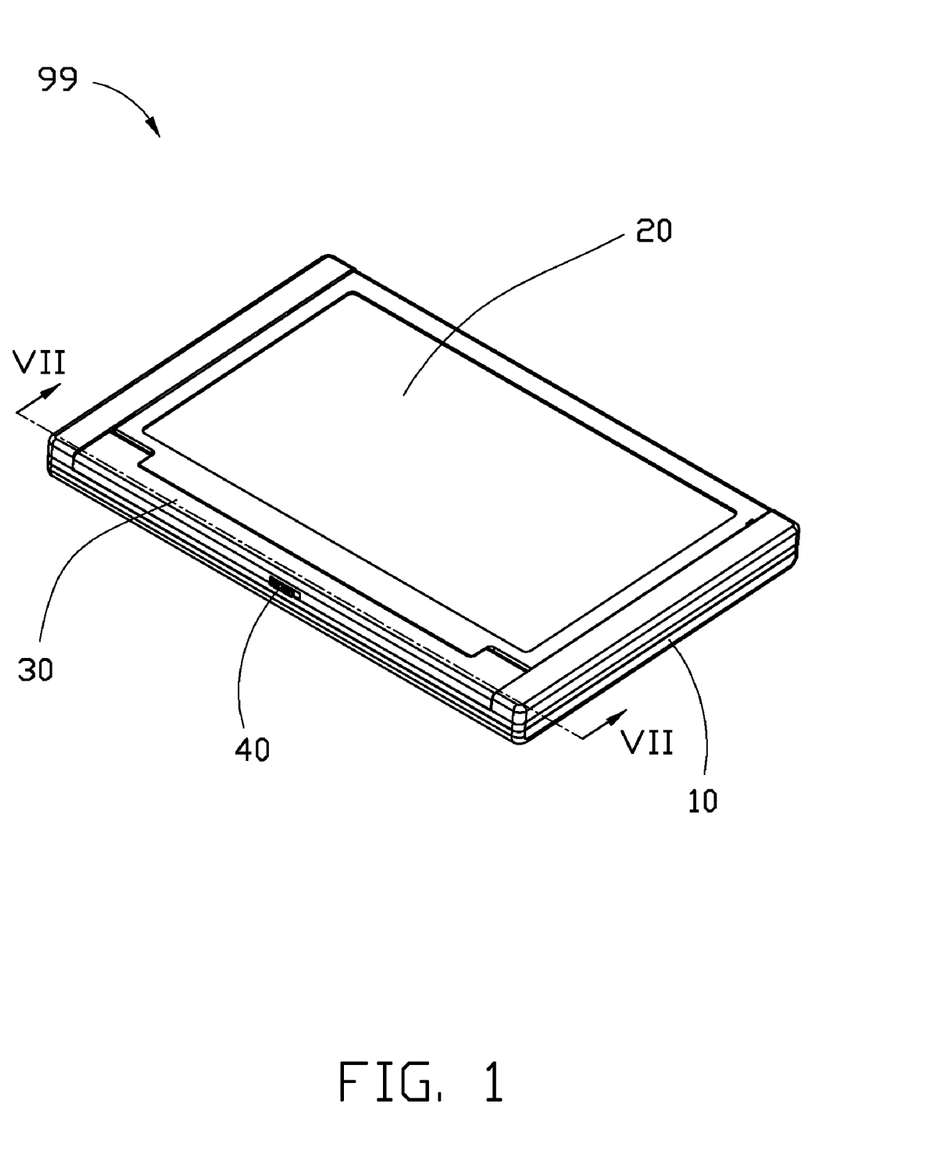
FIG. 1 is a perspective view of an electronic device in accordance with an embodiment, the electronic device including a body, a cover, a sliding apparatus, and a latch assembly having a latching portion.
Figure 2:
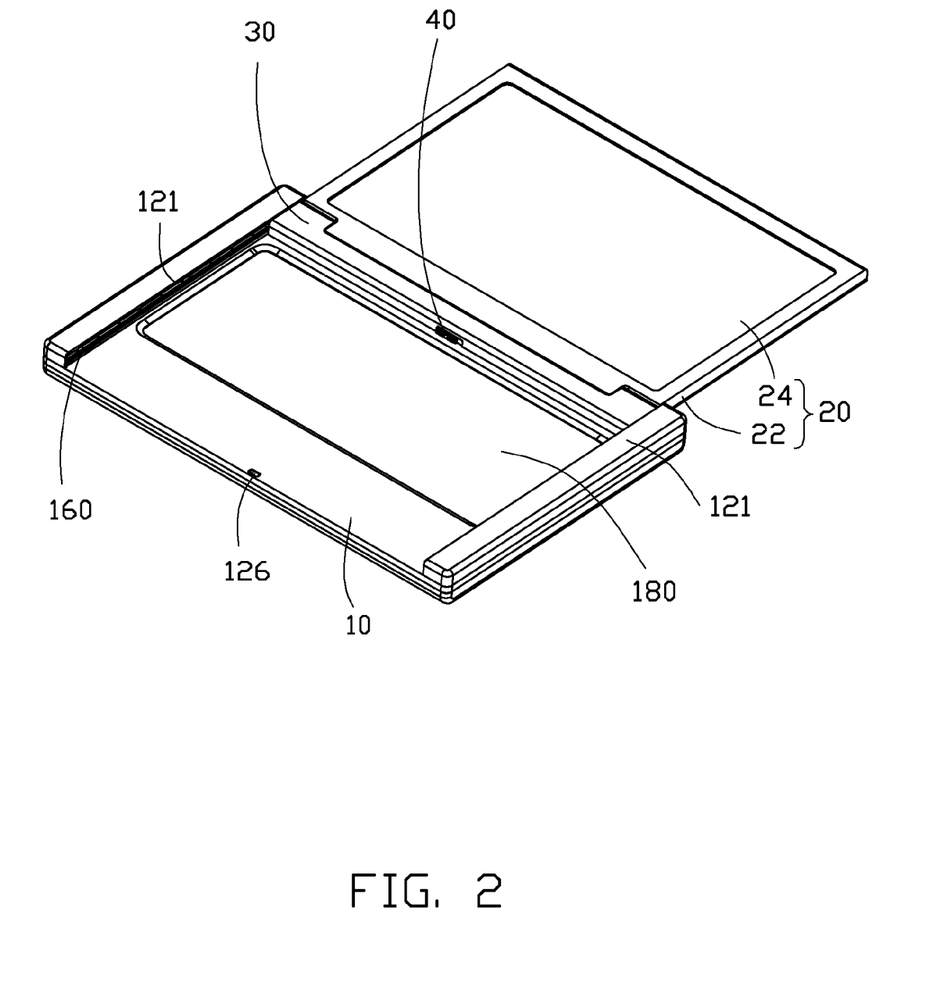
FIG. 2 is a perspective view of the electronic device of FIG. 1, while the cover is slid open relative to the body.
Figure 3:
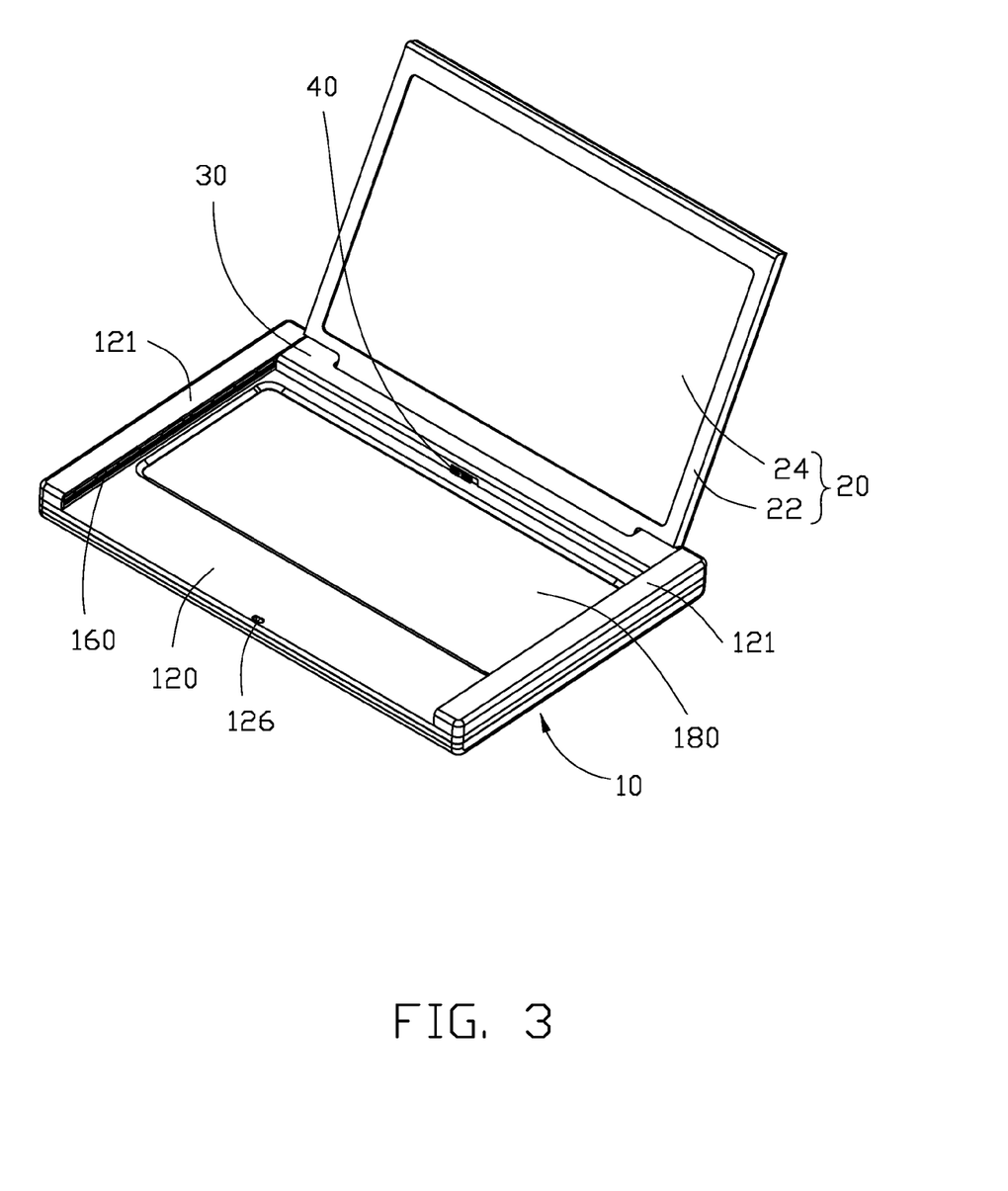
FIG. 3 is a perspective view of the electronic device of FIG. 2, while the cover further rotates on the sliding apparatus.

FIGS. 1-3 show an electronic device 99 in accordance with an embodiment. The electronic device 99 includes a body 10, a cover 20, a sliding apparatus 30, and a latch assembly 40. The sliding apparatus 30 is slidably coupled to the body 10. The cover 20 is rotatably coupled to the sliding apparatus 30. Namely, the cover 20 is slidably and rotatably coupled to the body 10 via the sliding apparatus 30. The latch assembly 40 is installed on the sliding apparatus 30 and is configured to latch and unlatch the sliding apparatus 30 with the body 10.

Figure 4:
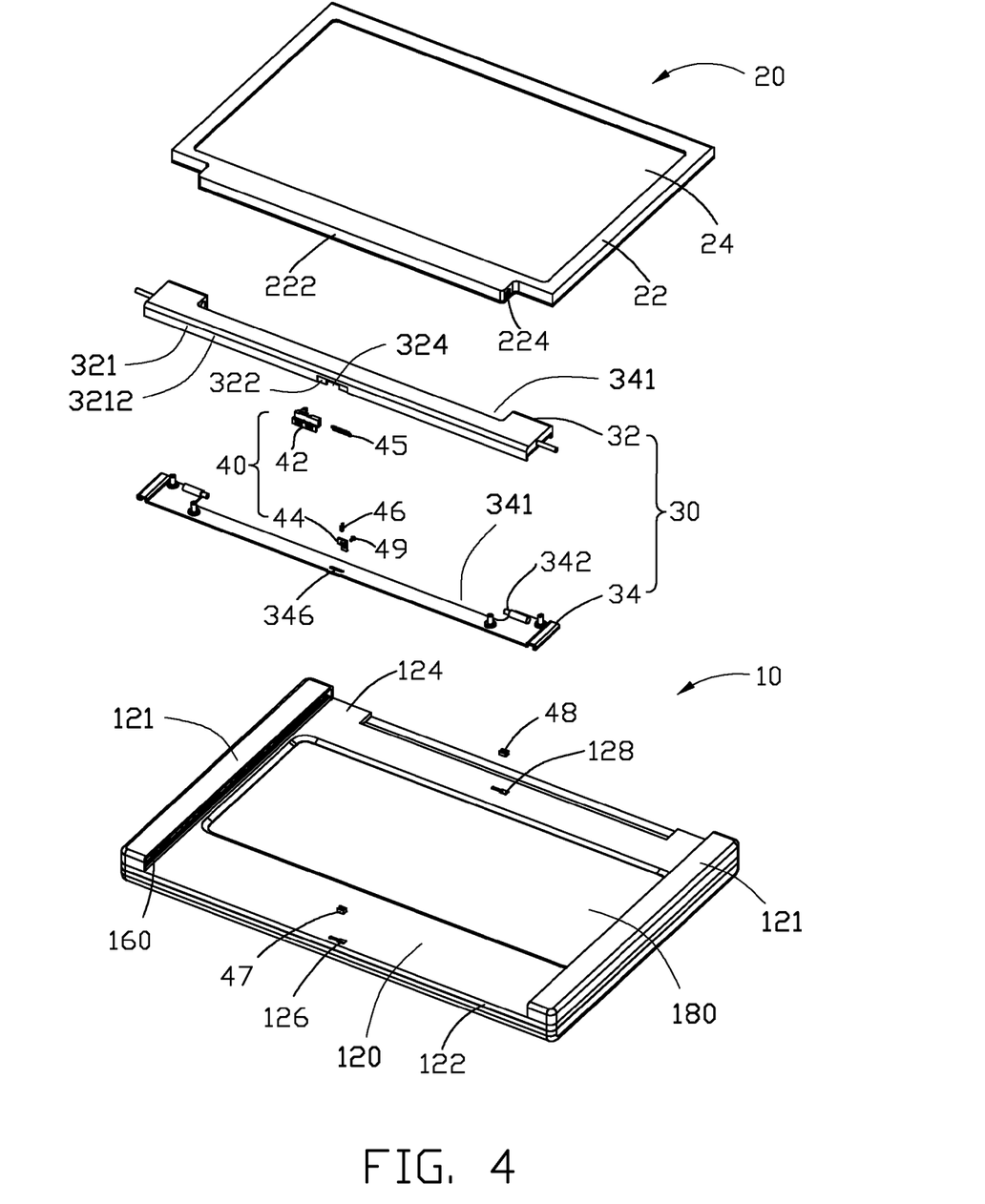
FIG. 4 is a disassembled perspective view of the electronic device shown in FIG. 1.

Referring also to FIG. 4, the body 10 is substantially rectangular. The body 10 includes a base sheet 120, two protruding walls 121, and two rims 122, 124. The two rims 122, 124 are configured at two sides of the base sheet 120. The two protruding walls 121 protrude upwardly from opposite sides of the base sheet 120 and are perpendicular to the two rims 122, 124. Each protruding wall 121 defines a sliding slot 160 immediately adjacent to the base sheet 120. The two sliding slots 160 are facing each other. The sliding slots 160 extend from the rim 122 to the rim 124. Two ends of the sliding apparatus 30 are correspondingly received in the two sliding slots 160 and are slidable along the sliding slots 160. Two blocking walls (not labeled) are configured at ends of each sliding slot 160 for preventing the sliding apparatus 30 from sliding off the ends of the sliding slot 160. The cover 20 is insertable in the sliding slots 160 and is confined in the sliding slots 160. The base sheet 120 defines two T-shaped notches 126, 128. The notches 126, 128 are adjacent to the rims 122, 124 correspondingly. A line (not shown) connecting the two notches 126, 128 is parallel to the sliding slots 160.

Figure 6:
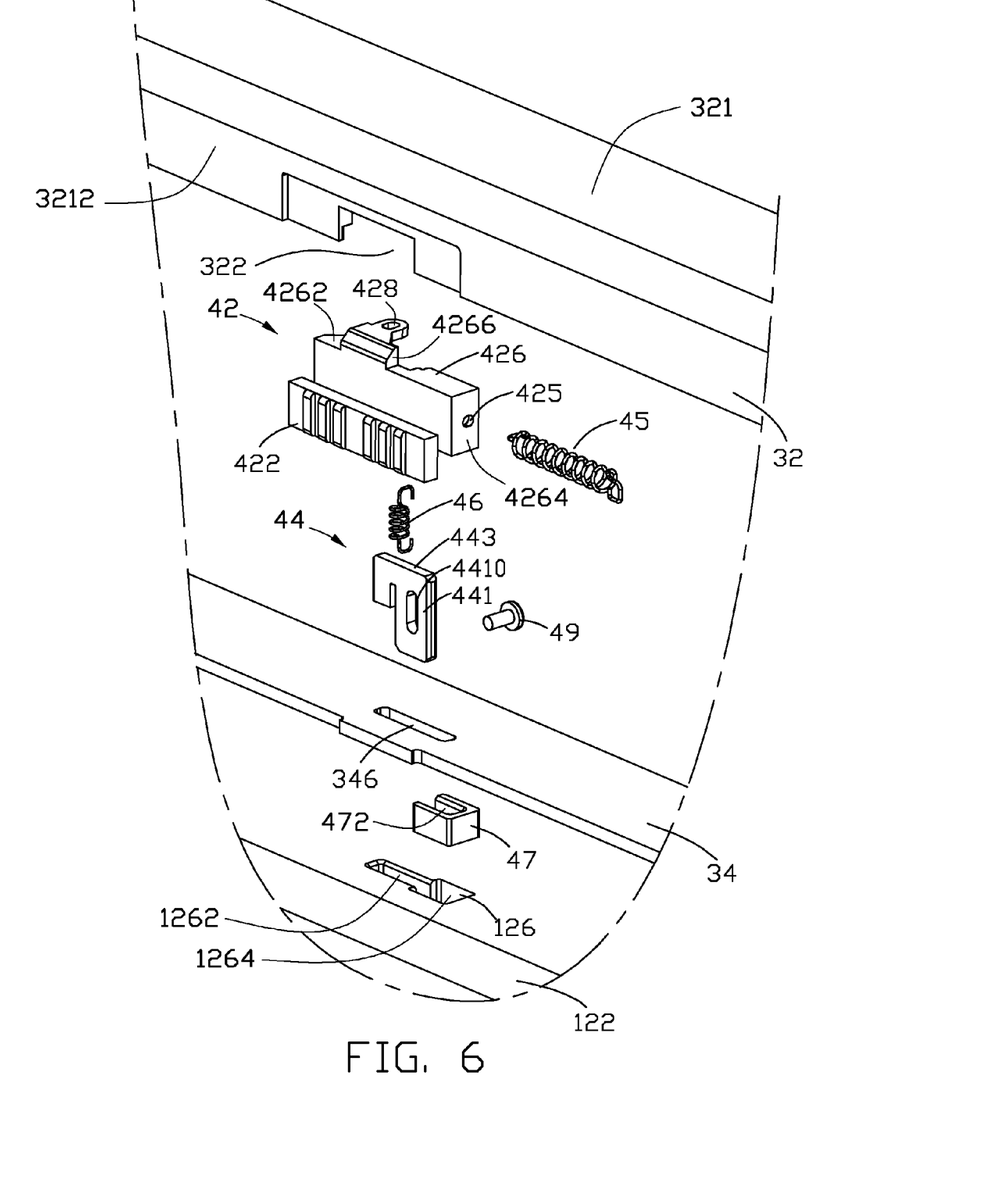
FIG. 6 is similar to FIG. 5, but viewed from another aspect.

Referring to FIG. 6, each notch 126, 128 includes a second elongated through hole 1262, and a rectangular slot 1264. Two magnetic members 47 are mounted in the rectangular slots 1264 correspondingly. Each magnetic member 47 defines an elongated slot 472. It should be noted, in assembly, the elongated slots 472 communicates with the second elongated through hole 1262. In the embodiment, the magnetic member 47 is a magnet.

Referring back to FIG. 4, the body 10 further includes an input device 180. The input device 180 is operable to provide inputs to the electronic device 99. The input device 180 is fixed to the base sheet 120. The input device 180 is surrounded by the sliding slots 160 and the notches 126, 128. In the embodiment, the input device 180 is a keyboard.

The length of the sliding apparatus 30 is longer than the distance between the two protruding walls 121. The sliding apparatus 30 defines an elongated strip slit 341. The sliding apparatus 30 includes a first portion 32, and a second portion 34. The second portion 34 is fixed to the first portion 32.

Figure 5:
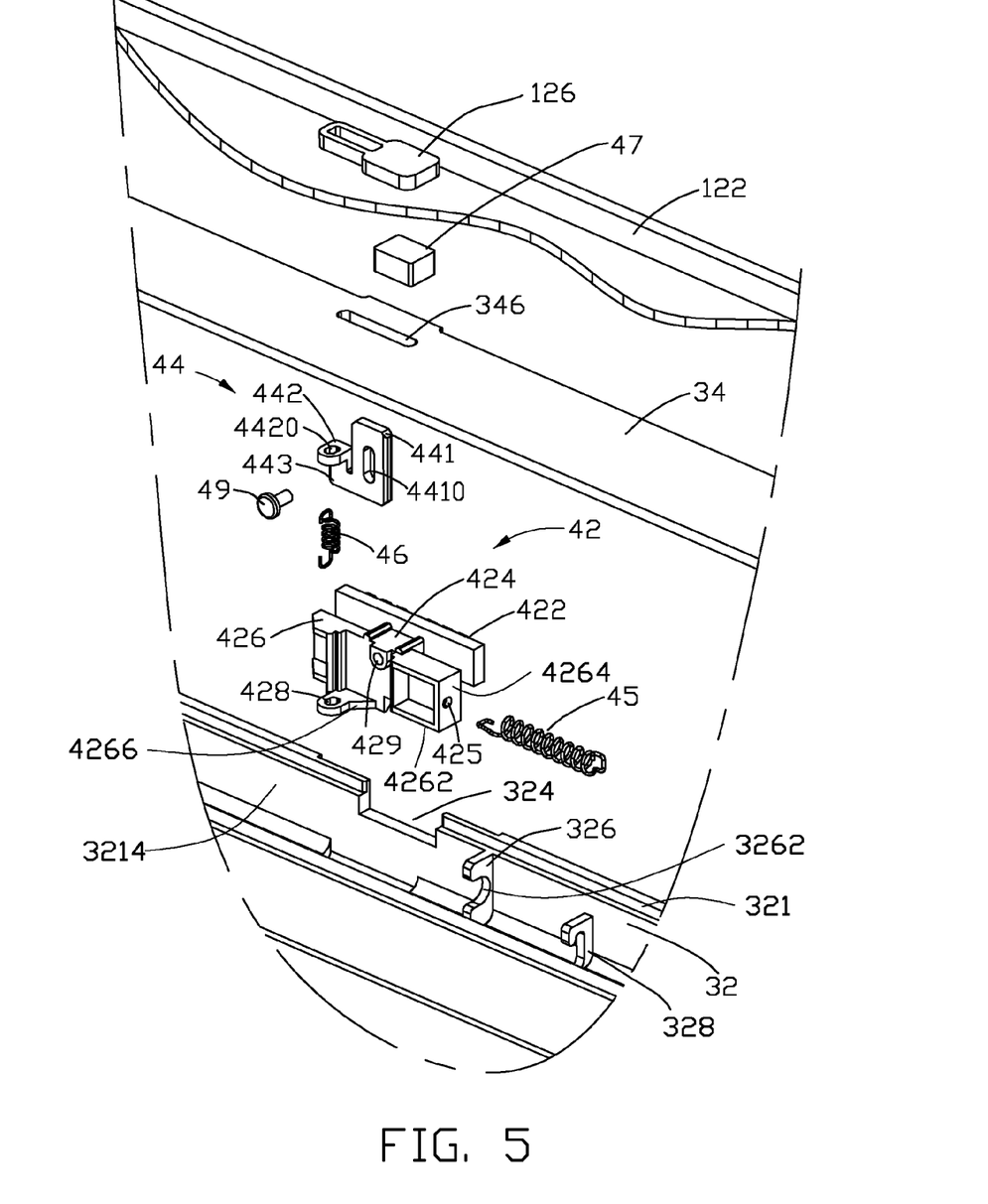
FIG. 5 is a partial, enlarged, disassembled perspective view of the latch assembly as shown in FIG. 4.

Referring to FIG. 5, the first portion 32 includes a sidewall 321 including an outer surface 3212, and an inner surface 3214 opposite to the outer surface 3212. The sidewall 321 is on a side of the first portion 32 opposite to the slit 341. The outer surface 3212 defines a recess 322. Further referring to FIGS. 5-6, the sidewall 321 further defines a rectangular opening 324 in a bottom of the recess 322. A stopper member 326 protrudes inwardly from the inner surface 3214 and is adjacent to the opening 324. The stopper member 326 defines a C-shaped recess 3262. A hook 328 also protrudes inwardly from the inner surface 3214. The stopper member 326 is disposed between the hook 328 and the opening 324.

The second portion 34 defines a first elongated through hole 346. The first elongated through hole 346 is substantially in the middle of the second portion 34. Referring back to FIG. 4, two pivot rods 342 are arranged at opposite edges of the slit 341. The two pivot rods 342 are coaxial and the axis thereof is parallel to the sidewall 321 after assembled.

The cover 20 is substantially rectangular. A display 24 is fixed to the cover 20. In the embodiment, the display 24 is a touch sensitive display for receiving touch inputs. A connecting board 222 extends from the cover 20. The connecting board 222 is received in the slit 341. Two ends of the connecting board 222 define two round holes 224 correspondingly. The round holes 224 are configured to receive the pivot rods 342, such that the cover 20 is rotatably connected to the sliding apparatus 30. The thickness of the cover 20 is substantially thinner than the height of the sliding slots 160, such that the cover 20 is insertable in the sliding slots 160 and is confined in the two sliding slots 160.

The latch assembly 40 includes a handle portion 42, a latching portion 44, and two elastic elements 45, 46. The handle portion 42 is installed in the recess 322 and is slidable relative thereto. The latching portion 44 is slidably coupled to the handle portion 42. The elastic element 45 is configured to connect the handle portion 42 with the hook 328 of the first portion 32. The elastic element 46 is configured to connect the latching portion 44 with the handle portion 42. In the embodiment, the elastic elements 45, 46 are helical springs.

Referring also to FIGS. 5-6, the handle portion 42 is substantially H-shaped. The handle portion 42 includes an actuating member 422, a connecting member 424, and a driving member 426. The actuating member 422 is coupled to the driving member 426 via the connecting member 424. The actuating member 422 is configured to receive user operations, such as, pushing. The driving member 426 includes two first sidewalls 4262, and a second sidewall 4264 connecting the two first sidewalls 4262. The first sidewalls 4262 are perpendicular to the second sidewall 4264. A protrusion 4266 protrudes upwardly from one of the first sidewalls 4262. The protrusion 4266 defines a first through hole 428. The second sidewall 4264 defines a second through hole 425. The first through hole 428 and the second through hole 425 are configured for clasping the elastic elements 45, 46 correspondingly. The first sidewall 4262 not defining the first through hole 428 defines a round recess 429 in the top. The round recess 429 extends along a direction perpendicular to the handle portion 42.

The latching portion 44 is substantially L-shaped. The latching portion 44 includes a sliding member 441, a protruding member 442, and a connecting member 443. The connecting member 443 connects the sliding member 441 with the protruding member 442. The sliding member 441 and the connecting member 443 are coplanar. The protruding member 442 is perpendicular to the sliding member 441 and the connecting member 443. The protruding member 442 defines a third through hole 4420. The third through hole 4420 is configured to clasp the elastic element 46. The sliding member 441 defines an elongated hole 4410. The elongated hole 4410 extends in a direction parallel to an axis of the third trough hole 4420. In the embodiment, the latching portion 44 is magnetic and may be a magnet or metal attractable by the magnetic member 47.

In assembly, firstly, a securing member 49 (such as, a bolt) is extended through the elongated hole 4410 and engaged into the round recess 429, such that the latching portion 44 is slidably coupled to the handle portion 42 in a manner such that the first through hole 428 and the third through hole 4420 are aligned. Two ends of the elastic element 46 are fastened to the first through hole 428 and the third through hole 4420 correspondingly, thus, the latching portion 44 is slidably and elastically coupled to the handle portion 42.

Secondly, after the latching portion 44 is coupled to the handle portion 42, the handle portion 42 is installed in the recess 322 in a manner such that the connecting member 443 resists against the rectangular opening 324 and the rectangular opening 324 is aligned between the actuating member 422 and the driving member 426, thus, the handle portion 42 together with the latching portion 44 is slidable along the recess 322. One end of the elastic element 45 is fastened to the second through hole 425, then, the elastic element 45 extends through the C-shaped recess 3262, such that the other end of the elastic element 45 is fastened to the hook 328. Thirdly, the second portion 34 is fixed to the first portion 32, such that the latch assembly 40 is installed in the sliding apparatus 30 with the latching portion 44 extendable out of and insertable into the first elongated through hole 346. Finally, the sliding apparatus 30 is confined between the sliding slots 160, and the pivot rods 342 extend through the round holes 224 correspondingly, such that the cover 20 is rotatably coupled to the sliding apparatus 30.

After assembly, the notches 126, 128, the first elongated through hole 346, and the sliding member 441 are in a same plane. The handle portion 42 is sandwiched between the first portion 32 and the second portion 34, and slides back and forth relative to the recess 322, such that latching portion 44 is driven to move back and forth when the actuating member 422 is drawn. It should be noted that, the elastic elements 45, 46 do not elastically deform (that is, remain in an original state) when there is no external force acting on the handle portion 42. Furthermore, an attraction between the latching portion 44 and the magnetic member 47 is larger than the force between the latching portion 44 and the elastic element 46 when the elastic element 46 elastically deforms. Thus, the elastic element 46 elastically deforms when the latching portion 44 is attracted by the magnetic member 47.

The elastic element 45 is perpendicular to the elastic element 46, the elastic element 45 is stretchable in a direction parallel to the sliding direction of the handle portion 42 relative to the sliding apparatus 30, and the elastic element 46 is capable of stretching in a direction parallel to the sliding direction of the latching portion 44 relative to the handle portion 42.

When the electronic device 99 is in a locked state (see FIG. 1), the sliding apparatus 30 and the cover 20 are in the same plane and are confined between the sliding slots 160. The sliding apparatus 30 is latched to the body 10 by extending the latching portion 44 into the notch 126. In the locked state, the electronic device 99 is capable of operable in a compact fashion, and the touch sensitive display 24 is used for receiving touch inputs.

Figure 7:
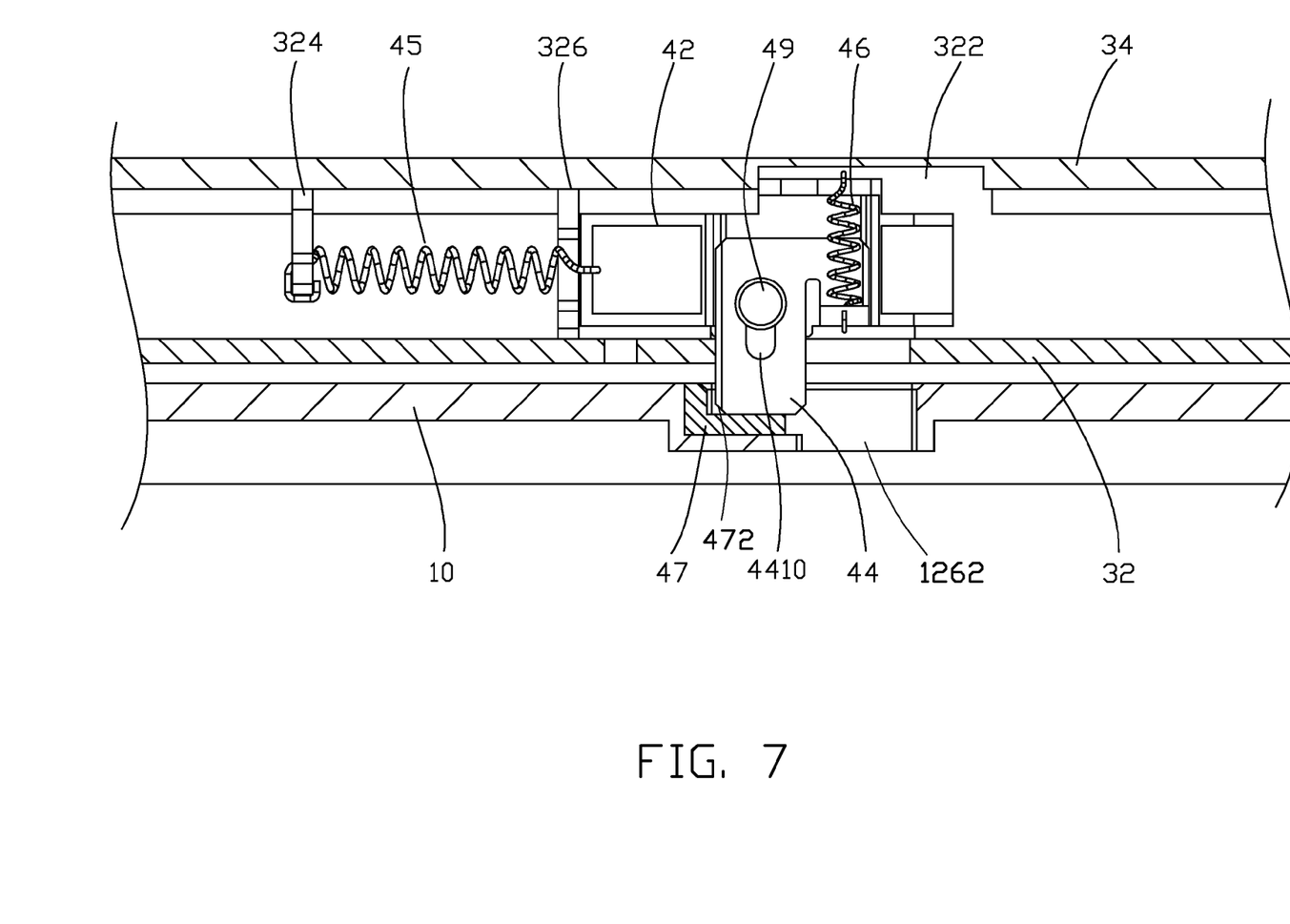
FIG. 7 is a cross-sectional view taken along line VII-VII of FIG. 1, showing the latching portion inserted into the body.

Referring to FIG. 7, in the locked state, as there is no external force acting on the handle portion 42, the elastic element 45 drives the handle portion 42 resisting against the stopper member 326. At the same time, because the latching portion 44 is attracted by the magnetic member 47, the latching portion 44 slides downward relative to the handle portion 42 to extend out of the sliding apparatus 30 and resists the magnetic member 47. The elastic element 46 is elastically deformed to store elastic energy. In this state, the latching portion 44 is inserted into the elongated slot 472 of the notch 126, and the sliding apparatus 30 is latched to the body 10.

Figure 8:
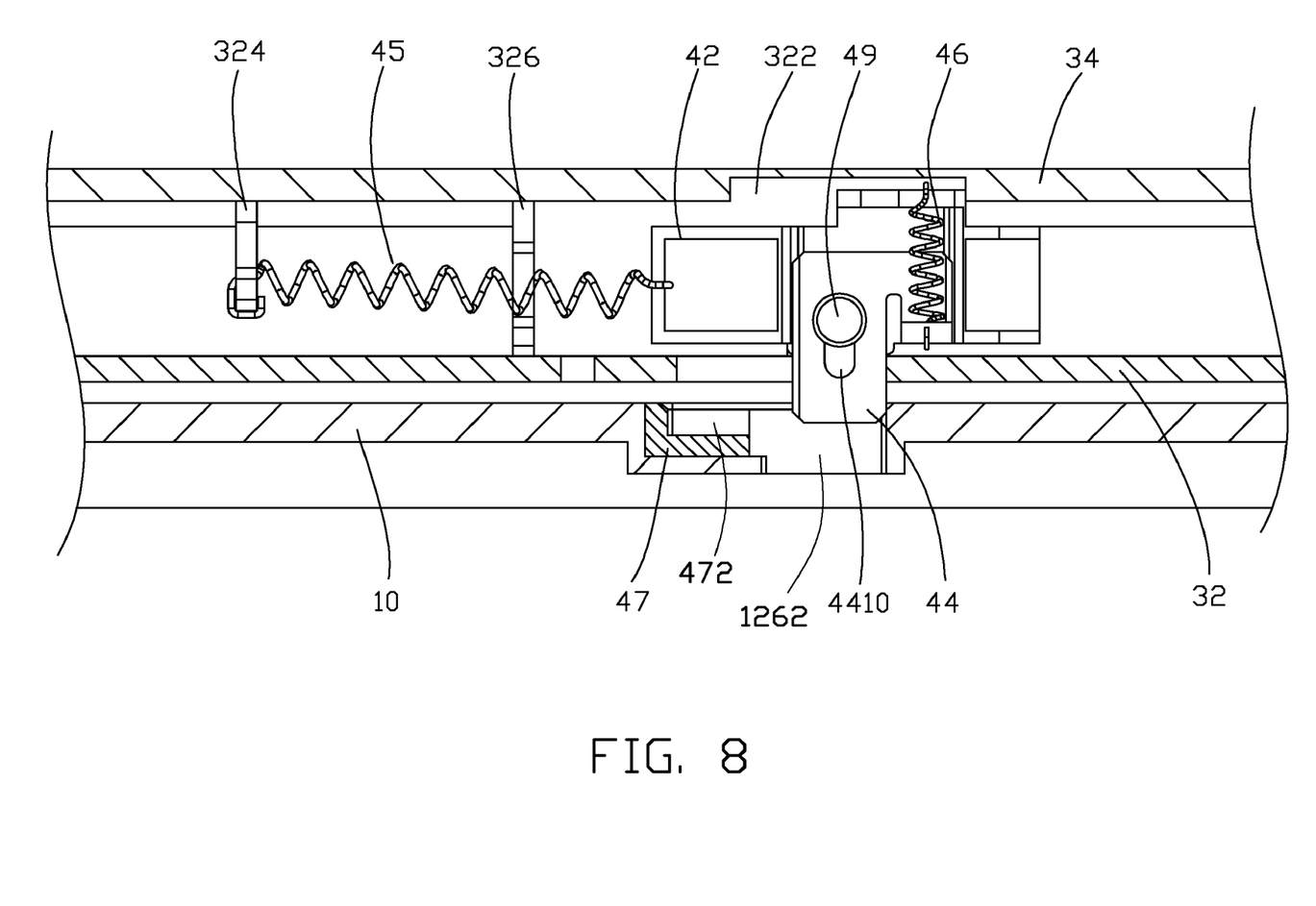
FIG. 8 is similar to FIG. 7, but showing the latching portion inserted into the sliding apparatus.
Figure 9:
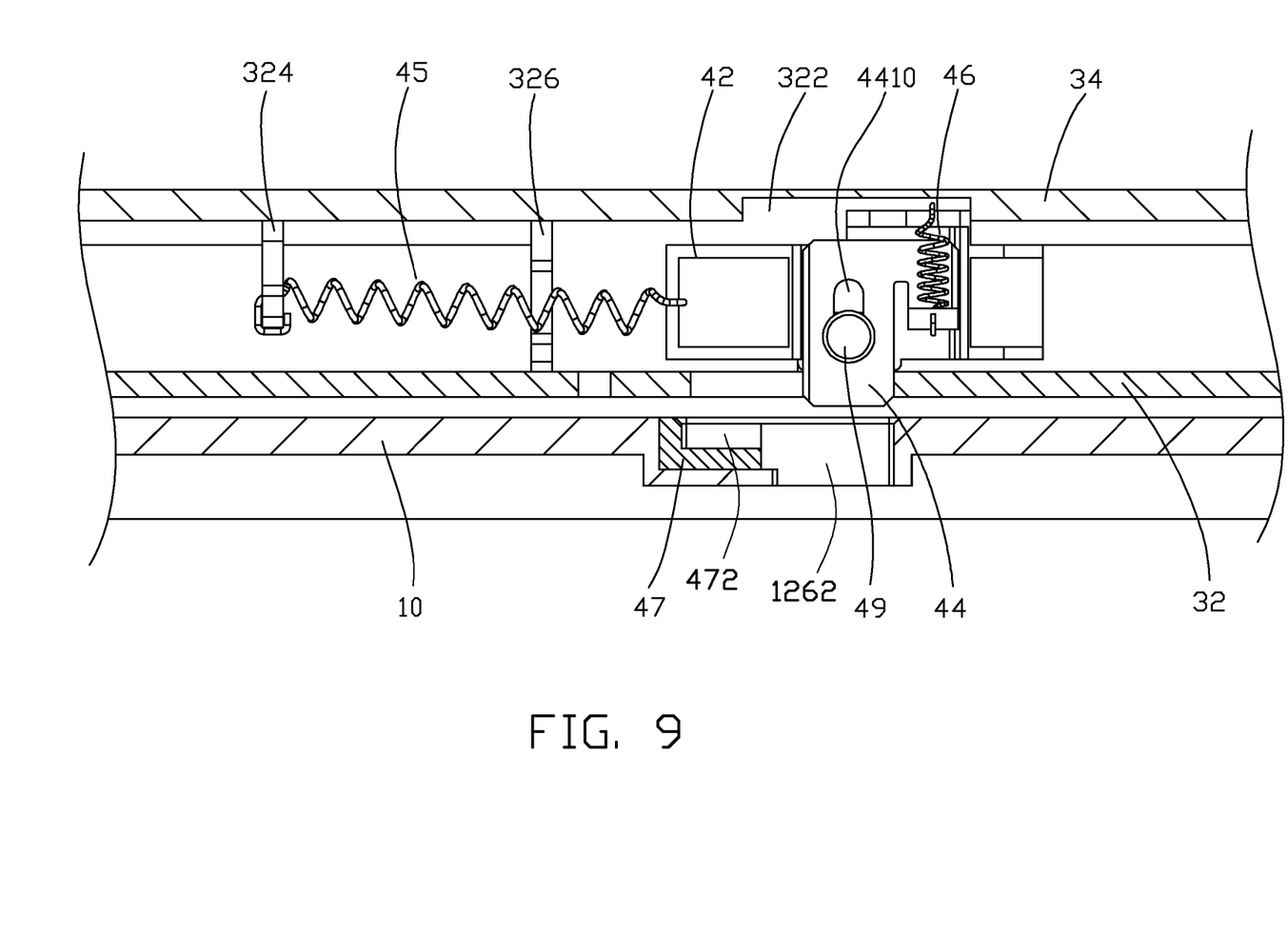
FIG. 9 is similar to FIG. 7, but shown the latching portion shielded in the sliding apparatus.

Referring to FIG. 8, when the handle portion 42 is slid away from the stopper member 326 by an external force (not shown), the latching portion 44 slides away from the elongated slot 472 and is received in the second elongated through hole 1262; the elastic element 45 is elastically deformed to store energy. Referring to FIG. 9, as the latching portion 44 is not attracted by the magnetic member 47, the elastic element 46 releases the elastic energy to return to normal, thus, the latching portion 44 slides upwards and is inserted into the sliding apparatus 30, and the sliding apparatus 30 is unlatched from the body 10.

Referring to FIGS. 2-3, after the sliding apparatus 30 is unlatched from the body 10, the sliding apparatus 30 is pushed toward the notch 128. When the first elongated through hole 346 is aligned with the notch 128, the elastic element 45 returns to normal and releases the elastic energy, and the handle portion 42 is driven to slide toward the stopper member 326, thus, the latching portion 44 becomes attracted by the magnetic member 47 and is inserted into the elongated slot 472 of the notch 128. As a result, the latch assembly 40 is latched to the body 10, and the cover 20 slides out of the slots 160. Afterwards, the cover 20 is rotated to a desired angle relative to the body 10. The electronic device 99 is unfolded. In this position, the electronic device 99 is in the unfolded fashion, and the input device 180 is operable to provide inputs to the electronic device 99.

When folding the electronic device 99, firstly, rotate the cover 20 until the cover 20 and the sliding apparatus 30 are coplanar. Secondly, operate the latch assembly 40 to push the latching portion 44 into the sliding apparatus 30. Then, slide the sliding apparatus 30 and the cover 20 toward the notch 126, such that the sliding apparatus 30 and the cover 20 are inserted into the slots 160. Finally, extend the latching portion 44 out of the sliding apparatus 30 to latch the sliding apparatus 30 to the body 10. Therefore, the electronic device 99 is folded.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device, comprising: a body defining two sliding slots and comprising at least one locking portion; a sliding apparatus received in the two sliding slots and slidable relative thereto; a cover rotatably coupled to the sliding apparatus and confined between the two sliding slots; and a latch assembly fixed to the sliding apparatus; wherein when the cover slides away from the two sliding slots, the latch assembly is operated to fasten with the at least one locking portion, the sliding apparatus is latched to the body, and the cover is rotatable relative to the sliding apparatus; wherein the body comprises a first locking portion and a second locking portion, the first locking portion and the second locking portion are located at a first end and a second end opposite to the first end of the body, the cover is capable of being moved from the first end to the second end by sliding the sliding apparatus in the two sliding slots, wherein both at the first end and the second end, the latch assembly is operated to fasten with the first locking portion and the second locking portion, thereby when the latch assembly is fastened with the first locking portion, the electronic device is capable of being configured to operate in a compact fashion, and when the latch assembly is fastened with the second locking portion, the electronic device is capable of being configured to operate in a foldable fashion; and wherein the latch assembly comprises a handle portion, a latching portion, at least one first elastic element, and at least one second elastic element, the handle portion is elastically and slidably coupled to the sliding apparatus via the at least one first elastic element, the latching portion is slidably coupled to the handle portion and is elastically coupled to the sliding apparatus via the at least one second elastic element, the handle portion is fixed to the latching portion, and the handle portion is configured to drive the latching portion to slide relative to the sliding apparatus.

2. The electronic device of claim 1, wherein a part of the at least one locking portion comprises a magnetic member, the latch assembly is attracted to the magnetic member for latching with the at least one locking portion.

3. The electronic device of claim 1, wherein the latching portion slides relative to the handle portion in a direction perpendicular to a direction that the handle portion slides relative to the sliding apparatus.

4. The electronic device of claim 1, wherein the at least one first elastic element is perpendicular to the at least one second elastic element, the at least one first elastic element is capable of stretching in a direction parallel to the direction that the handle portion slides relative to the sliding apparatus, and the at least one second elastic element is capable of stretching in a direction parallel to the direction that the latching portion slides relative to the handle portion.

5. The electronic device of claim 1, wherein the latching portion comprises a sliding member and a protruding member, the protruding member is fixed to the sliding member and is perpendicular thereto.

6. The electronic device of claim 5, wherein the sliding member defines an elongated hole, the latching portion is slidably coupled to the handle portion via the elongated hole.

7. An electronic device capable of being moved between an unfolded state and a folded state, the electronic device comprising: a first electronic member; a second electronic member slidably and rotatably coupled to the first electronic member; and a sliding apparatus for connecting the first electronic member with the second electronic member, the sliding apparatus comprising a latch assembly; wherein the second electronic member is capable of assuming a first position and a second position relative to the first electronic member via the latch assembly, wherein at the first position, the second electronic member substantially covers the first electronic member, and at the second position, the second electronic member is rotatable relative to the first electronic member; wherein two opposite ends of the first electronic member define two slots correspondingly, the second electronic member and the sliding apparatus are confined between the two slots and slidable relative thereto; and wherein the latch assembly comprises a handle portion, a latching portion, and at least two elastic elements, the handle portion is elastically and slidably coupled to the sliding apparatus via one of the at least two elastic elements, the latching portion is slidably coupled to the handle portion and is elastically coupled to the sliding apparatus via another one of the at least two elastic elements, the handle portion is fixed to the latching portion, and the handle portion is configured to drive the latching portion to slide relative to the sliding apparatus.

8. The electronic device of claim 7, wherein the latching portion slides relative to the handle portion in a direction perpendicular to a direction that the handle portion slides relative to the sliding apparatus.

9. The electronic device of claim 7, wherein one of the at least two elastic elements is perpendicular to the other one of the at least one two elastic elements, one of the at least two elastic elements is capable of stretching in a direction parallel to the direction of the movement of the handle portion sliding relative to the sliding apparatus, and the other one of the at least two elastic elements is capable of stretching in a direction parallel to the direction of the movement of the latching portion sliding relative to the handle portion.

10. The electronic device of claim 7, wherein the latching portion comprises a sliding member and a protruding member, the protruding member is fixed to the sliding member and is perpendicular thereto.

11. The electronic device of claim 10, wherein the sliding member defines an elongated hole, the latching portion is slidably coupled to the handle portion via the elongated hole.

12. An electronic device capable of being used in a first manner and in a second manner, the electronic device comprising: a first electronic member defining two sliding slots and comprising at least one locking portion; a sliding apparatus received in the two sliding slots and slidable relative thereto; a second electronic member rotatably coupled to the sliding apparatus and confined between the two sliding slots; and a latch assembly fixed to the sliding apparatus; wherein the electronic device is capable of being operated from a closed state to an opened state, in the closed state, the second electronic member substantially covers the first electronic member and the electronic device is used in the first manner, in the opened state, the second electronic member is rotatable relative to the first electronic member and the electronic device is used in the second manner; and wherein the latch assembly comprises a handle portion, a latching portion, at least one first elastic element, and at least one second elastic element, the handle portion is elastically and slidably coupled to the sliding apparatus via the at least one first elastic element, the latching portion is slidably coupled to the handle portion and is elastically coupled to the sliding apparatus via the at least one second elastic element, the handle portion is fixed to the latching portion, and the handle portion is configured to drive the latching portion to slide relative to the sliding apparatus.

13. The electronic device of claim 12, wherein the second electronic member is a touch sensitive display, when the electronic device is in the closed state, the touch sensitive display is operated as a first input device to receive touch inputs.

14. The electronic device of claim 12, wherein the first electronic member comprises a second input device, the second input device is sandwiched between the first electronic member and the second electronic member when the electronic device is in the closed state, and the second input device is operated to provide inputs to the electronic device when the electronic device is in the opened state.

* * * * *

UNITED STATES PATENT AND TRADEMARK OFFICE
CERTIFICATE OF CORRECTION

PATENT NO. : 8,385,063 B2  
APPLICATION NO. : 12/629898  
DATED : February 26, 2013  
INVENTOR(S) : Zhu et al.

Page 1 of 1

It is certified that error appears in the above-identified patent and that said Letters Patent is hereby corrected as shown below:

On the title page, item [30] "Foreign Application Priority Data" should read as follows:

Item (30)    Foreign Application Priority Data

Jul. 16, 2009   (CN) .........................2009 1 0304435

Signed and Sealed this  
Fifteenth Day of October, 2013

Teresa Stanek Rea  
*Deputy Director of the United States Patent and Trademark Office*